US012618517B2

(12) United States Patent
Fujie et al.

(10) Patent No.: US 12,618,517 B2
(45) Date of Patent: May 5, 2026

(54) HIGH-PRESSURE GAS TANK

(71) Applicant: TOYOTA JIDOSHA KABUSHIKI KAISHA, Toyota (JP)

(72) Inventors: Yuki Fujie, Aichi-ken (JP); Takeshi Ishikawa, Toyokawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/911,254

(22) Filed: Oct. 10, 2024

(65) Prior Publication Data

US 2025/0237351 A1 Jul. 24, 2025

(30) Foreign Application Priority Data

Jan. 19, 2024 (JP) ................................. 2024-007047

(51) Int. Cl.
*F17C 1/06* (2006.01)

(52) U.S. Cl.
CPC ........ *F17C 1/06* (2013.01); *F17C 2201/0109* (2013.01); *F17C 2203/012* (2013.01);
(Continued)

(58) Field of Classification Search
CPC ................ F17C 1/06; F17C 2201/0109; F17C 2203/012; F17C 2203/0604; F17C 2203/0619; F17C 2205/0308; F17C 2205/0311; F17C 2260/04; F17C 2270/0168; F17C 2270/0184; F17C 13/06; Y02E 60/32
(Continued)

(56) References Cited

U.S. PATENT DOCUMENTS 5,004,120 A * 4/1991 Hembert ............... F17C 13/123 220/62.19
2004/0026437 A1* 2/2004 Hembert ............... F17C 13/123 220/630

(Continued)

FOREIGN PATENT DOCUMENTS

JP 2023-026058 A 2/2023
KR 20230095150 A * 6/2023 ................ F17C 1/02

OTHER PUBLICATIONS

English Machine Translation of KR-20230095150-A (Year: 2023).*
Fujie et al., "Toyota Gijutsukokaishu No. JP39970", (Nov. 30, 2023).

*Primary Examiner* — Laura E. Parker
(74) *Attorney, Agent, or Firm* — SoraIP, Inc.

(57) ABSTRACT

A high-pressure gas tank includes: a tank body including a body portion and a dome portion disposed on one side of the body portion in the axial direction; a cap having a shaft portion extending from a central portion of the dome portion along the axial direction and a through-hole through which the gas flows through the shaft portion; and a protective member that includes a protective portion covering the dome portion around the cap and made of resin and a connecting portion integrated with the protective portion, having an annular shape or a tubular shape into which the shaft portion of the cap is inserted, and made of metal. The cap includes a first threaded portion on an outer periphery of the shaft portion, and the protective member includes a second threaded portion screwed to the first threaded portion on an inner periphery of the connecting portion.

3 Claims, 5 Drawing Sheets

(52) U.S. Cl.
CPC ................. *F17C 2203/0604* (2013.01); *F17C 2203/0619* (2013.01); *F17C 2203/0646* (2013.01); *F17C 2203/0673* (2013.01); *F17C 2205/0308* (2013.01); *F17C 2205/0311* (2013.01); *F17C 2221/012* (2013.01); *F17C 2223/036* (2013.01); *F17C 2260/04* (2013.01); *F17C 2270/0168* (2013.01); *F17C 2270/0184* (2013.01)

(58) Field of Classification Search
USPC .......................................... 220/590, 581, 586
See application file for complete search history.

(56) References Cited

U.S. PATENT DOCUMENTS

| | | | | |
|---|---|---|---|---|
| 2018/0202553 | A1* | 7/2018 | Ueda | B32B 25/10 |
| 2021/0215294 | A1* | 7/2021 | Kojima | F17C 1/06 |
| 2023/0213145 | A1* | 7/2023 | Woo | B60K 15/07 220/562 |
| 2024/0175545 | A1* | 5/2024 | Farines | F17C 1/16 |
| 2025/0137599 | A1* | 5/2025 | Heo | F17C 1/00 |

* cited by examiner

HIGH-PRESSURE GAS TANK

CROSS-REFERENCE TO RELATED APPLICATION

This application claims priority to Japanese Patent Application No. 2024-007047 filed on Jan. 19, 2024, incorporated herein by reference in its entirety.

BACKGROUND

1. Technical Field

The present specification relates to a high-pressure gas tank.

2. Description of Related Art

As a high-pressure gas tank of this type, a fixing structure for a protective member that protects a tank from shock absorption is disclosed (Japanese Unexamined Patent Application Publication No. 2023-26058 (JP 2023-26058 A)). In the high-pressure gas tank, a fixing bracket provided in a protective member and made of metal is fixed to a cap of the tank with a plurality of bolts.

SUMMARY

However, according to the fixing structure, a fastening force of the bolts acts on the cap in a radial direction when the fixing bracket and the cap are fastened with the bolts. Since the cap is easily deformed due to a force in the radial direction, the cap may be deformed in accordance with a fastening force acting on the cap.

The present specification provides a technology of suppressing a load on a tank when a protective member is fixed to the tank.

The disclosure of the present specification is embodied in a high-pressure gas tank.

The high-pressure gas tank includes:

a tank body that includes a body portion and a dome portion disposed on one side of the body portion in an axial direction;

a cap that includes a shaft portion extending along the axial direction from a central portion of the dome portion and a through-hole penetrating through the shaft portion to allow gas to be distributed through the shaft portion; and a protective member that includes a protective portion covering the dome portion around the cap and made of resin and a connecting portion integrated with the protective portion, having an annular shape or a tubular shape into which the shaft portion of the cap is inserted, and made of metal.

The cap includes a first threaded portion at an outer periphery of the shaft portion, and the protective member includes a second threaded portion that is screwed to the first threaded portion at an inner periphery of the connecting portion.

According to the high-pressure gas tank, the protective member can be fixed to the cap by screwing the second threaded portion provided at the connecting portion of the protective member to the first threaded portion provided at the shaft portion of the cap. Since a fastening force of these threaded portions acts on the cap in the axis direction, deformation of the cap is effectively suppressed.

Moreover, according to the high-pressure gas tank, a fastening member such as a bolt is not required, and it is thus possible to easily, quickly, and accurately achieve fastening and fixing without requiring an additional member or equipment for the fastening and the fixing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A tank body of a high-pressure gas tank disclosed herein includes a body portion and a dome portion disposed on one side of the body portion in an axial direction.

A cap includes a shaft portion extending along the axial direction from a central portion of the dome portion, and a through hole through which gas can flow through the shaft portion. The protective member includes a resin protective portion covering the dome portion around the cap, and a metal connecting portion integrated with the protective portion and having an annular shape or a cylindrical shape into which the shaft portion of the cap is inserted. The cap includes a first threaded portion at an outer periphery of the shaft portion, and the protective member includes a second threaded portion that is screwed to the first threaded portion at an inner periphery of the connecting portion.

In one embodiment of the high-pressure gas tank, the shaft portion may include a first movement suppressing member that suppresses movement of the protective member toward the one side. By doing so, it is possible to easily and/or reliably suppress the looseness and the detachment after the fastening of the protective member. The first movement suppressing member may include a third threaded portion screwed to the first threaded portion.

In one aspect of the high-pressure gas tank, the dome portion includes a fiber-reinforced resin layer, and the shaft portion includes a second movement suppressing member that suppresses proximity of the protective member to the fiber-reinforced resin layer. In this way, it is possible to prevent the fiber-reinforced resin layer from coming into contact with and being damaged when the protective member is fastened.

In one aspect of the high-pressure gas tank, a refractory layer held by the protective member is provided between the protective member and a surface of the dome portion, and the protective member is integrated with the protective portion and the connecting portion by an adhesive softened by heating. Thus, even when the refractory layer is expanded by heating, the connecting portion is separated from the refractory layer by softening of the adhesive at the same time, without hindering the development or improvement of the heat insulating function due to the expansion of the refractory layer.

Hereinafter, the high-pressure gas tank disclosed in the present specification will be described with reference to the drawings as appropriate. In the present specification, the gas stored or supplied by the high-pressure gas tank is not particularly limited, but is, for example, hydrogen. The high-pressure gas tank is, for example, a hydrogen tank for the operation of a vehicle or a stationary fuel cell. The high-pressure gas tank is not particularly limited, but is, for example, a gas tank having a withstand pressure of 20 MPa or higher. The pressure resistance of a typical hydrogen-tank is 70 MPa.

Figure 1:
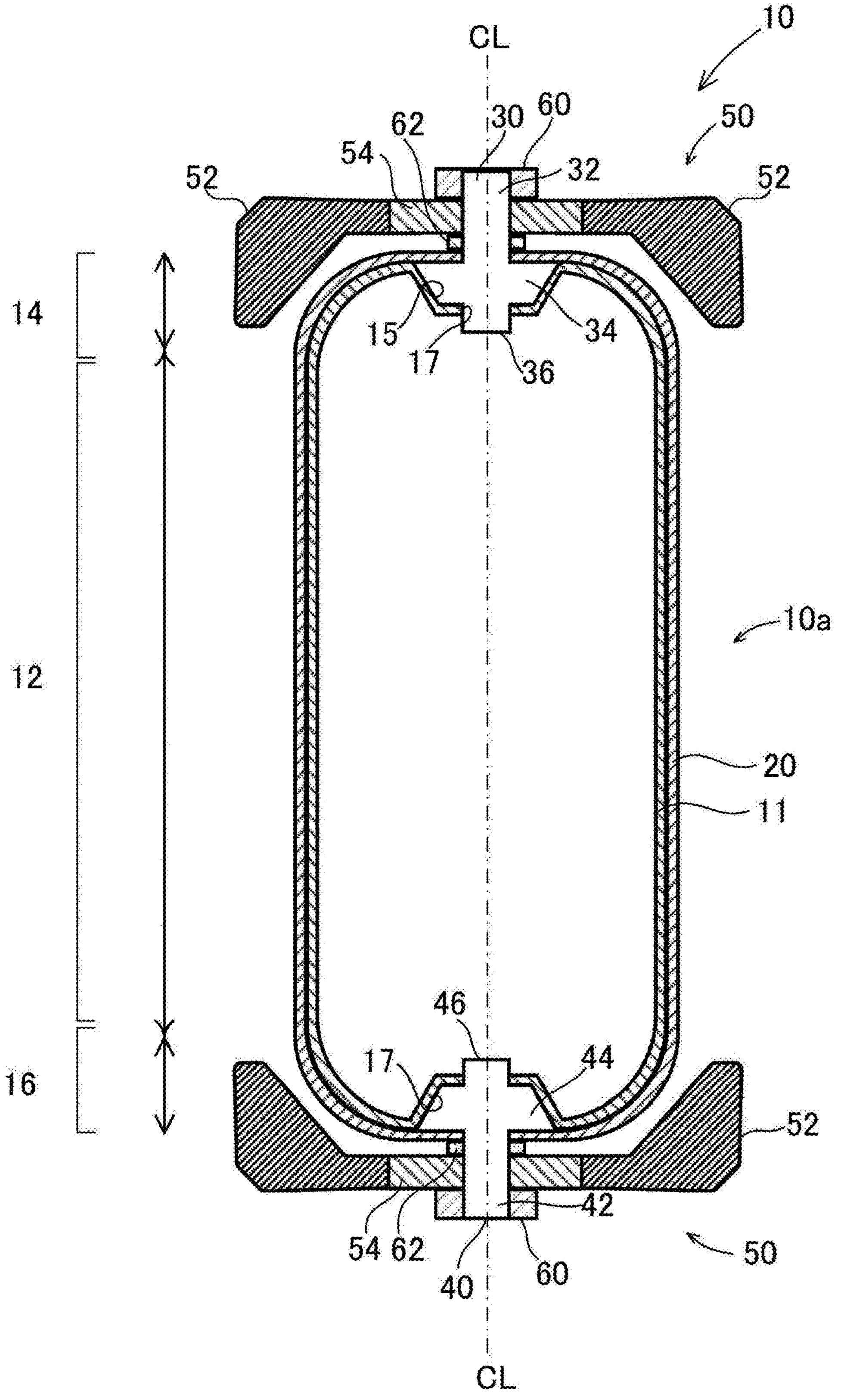
FIG. 1 is a cross-sectional view showing a high-pressure gas tank.
Figure 2:
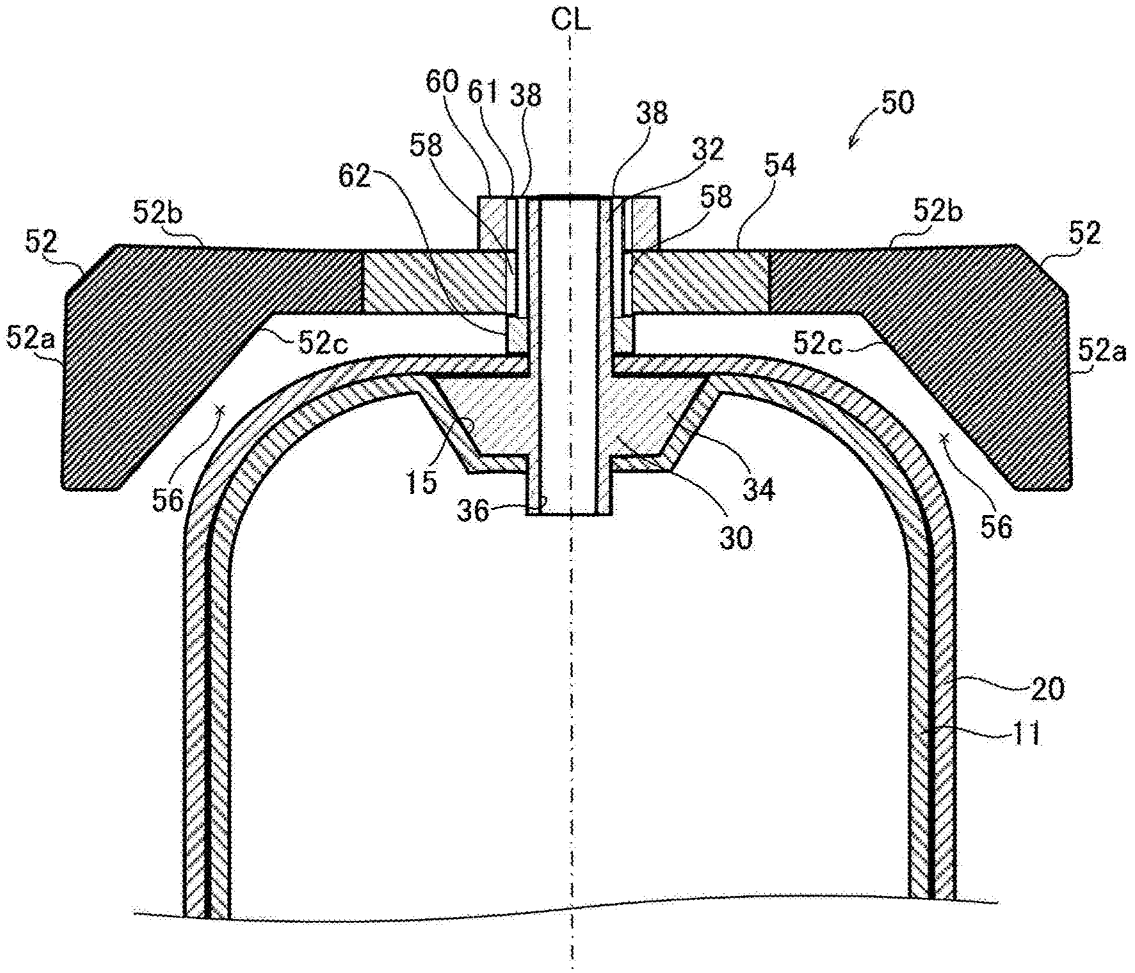
FIG. 2 is an enlarged cross-sectional view showing the vicinity of the dome portion of the high-pressure gas tank.

FIG. 1 is a cross-sectional view illustrating the entire high-pressure gas tank. FIG. 2 is an enlarged cross-sectional view in the vicinity of a dome portion of the high-pressure gas tank. FIG. 3 is a diagram illustrating various aspects of an integrated structure of a protective portion and a connecting portion in the protective member. FIG. 4 is a diagram illustrating a fastening and fixing step of the protective member.

A high-pressure gas tank (hereinafter, simply referred to as a tank) 10 shown in FIG. 1 includes a tank body 10*a* which is a cylindrical hollow container as a whole, a cap 30 on one side (upward in the drawing) in the axial CL of the tank body 10*a*, a cap 40 on the other side, and a protective member 50.

The main body of the tank 10 has a so-called gas barrier property as a whole, and a high-pressure gas such as hydrogen is supplied to the inside thereof. The tank body 10*a* is formed from the liner 11 and the reinforcing layers 20. The liner 11 is for forming a space for filling hydrogen, and is produced, for example, by resin molding. When the liner 11 is formed by resin molding, it is formed integrally with a known engineering plastic having high mechanical strength by a rotary molding method or a blow molding method. The liner 11 may be made of a light metal such as aluminum.

The reinforcing layer 20 covers the outer periphery of the liner 11 in order to reinforce the liner 11. The reinforcing layers 20 are made of a known fiber-reinforced plastic, for example, Carbon Fiber Reinforced Plastics (CFRP). The type of the fiber and the resin in the reinforcing layer 20 is not particularly limited and can be used. The winding method of the fibers in the reinforcing layer 20 in the layer is not particularly limited. The reinforcing layer 20 is an example of a fiber-reinforced resin layer in the present specification.

As shown in FIG. 1, the tank body 10*a* includes a cylindrical body portion 5 12 and dome portions 14 and 16 provided to close both ends of the body portion 12 along the axial direction. The body portion 12 includes a liner 11 and a reinforcing layer 20, and is a cylindrical body portion. The body portion 12 has a central axis coinciding with the axial CL. The dome portions 14 and 16 are portions of the tank body 10*a* including the liner 11 and the reinforcing layers 20, and close both end portions of the body portion 12 in the axial CL. The dome portions 14 and 16 have, for example, a curved planar shape, and specifically have a slightly flat hemispherical shape.

The dome portion 14 includes a cap mounting portion 15 perpendicular to the axial CL. In the cap mounting portion 15, only the liner 11 of the dome portion 14 is formed in a concave shape on one side (upper side in the drawing), and the flange portion 34 of the cap 30 to be described later can be held. A through hole through which the cap 30 is inserted is formed in a central portion of the cap mounting portion 15.

As shown in FIGS. 1 and 2, the cap 30 includes a shaft portion 32 and a flange portion 34. It should be noted that in FIG. 1, the caps 30 and 40 are shown in a plane rather than a cross-section for clarity in the drawing. The cap 30 is fixed to the tank body 10*a* via the flange portion 34 and the cap mounting portion 15. The shaft portion 32 is formed in a cylindrical shape extending from a central portion of the dome portion 14 to one side. The flange portion 34 is provided with the shaft portion 32 at the center thereof, and is formed so as to enlarge the outer edge of the shaft portion 32 in the radial direction of the shaft portion 32. The cap 30 includes a through hole 36 that penetrates the shaft portion 32 and the flange portion 34, and a valve (not shown) including a safety valve or the like is fastened by screwing.

As shown in FIG. 2, the shaft portion 32 is provided with a male threaded portion 38 on the outer peripheral surface 32*a* thereof. The male threaded portion 38 is an example of the first threaded portion disclosed herein.

The flange portion 34 of the cap 30 is covered with a reinforcing layer 20 constituting a part of the dome portion 14. On the other hand, the shaft portion 32 is not covered by the reinforcing layer 20, or only the base portion thereof is covered. The cap 30 is integrally formed of, for example, a metal material.

Like the dome portion 14, the dome portion 16 also includes a cap mounting portion 17 perpendicular to the axial CL. The cap mounting portion 17 is formed such that only the liner 11 of the dome portion 16 is formed in a concave shape on the other side (lower side in the drawing), so that the flange portion 44 of the cap 40 can be held. A through hole 46 through which the cap 40 is inserted is formed in a central portion of the cap mounting portion 17.

The cap 40, similarly to the cap 30, has a shaft portion 42, a flange portion 44, as shown well in FIG. 2. The cap 40 is fixed to the tank body 10*a* via the flange portion 44 and the cap mounting portion 17. The shaft portion 42 is formed in a cylindrical shape extending from the central portion toward the other side of the dome portion 16, and the flange portion 44 is formed so as to include the shaft portion 42 at the center and to be stepped in the radial direction. The cap 40 is used for heat dissipation, holding during formation of the reinforcing layer 20, and the like.

Like the cap 30, the flange portion 44 of the cap 40 is also covered with a reinforcing layer 20 forming a part of the dome portion 16. The cap 40 is also integrally formed of, for example, a metal material.

Next, the protective member 50 will be described. Although the protective member 50 is similarly mounted to both of the dome portions 14 and 16, the protective member 50 fixed to the dome portion 14 will be described for convenience of explanation, and the protective member 50 fixed to the dome portion 16 will not be described.

As shown in FIG. 2, the protective member 50 is fixed to the tank body 10*a* via the cap 30. The protective member 50 includes a protective portion 52 and a connecting portion 54.

The protective portion 52 is an outer shell that is spaced apart from the surface of the dome portion 14 and covers most of it. For example, as illustrated in FIGS. 1 and 2, the protective portion 52 includes a side wall portion 52*a* and a panel portion 52*b*. The side wall portion 52*a* is formed in a cylindrical shape covering the outer periphery of the dome portion 14. The panel portion 52*b* is formed in a circular shape covering the opening of the side wall portion 52*a*, and has an opening in the center of which the connecting portion 54 can be integrated.

Further, the inner peripheral surface 52*c* of the protective portion 52 facing the surface of the dome portion 14 is a hemispherical inner surface substantially along the hemispherical surface profile of the dome portion 14. As a result, the thickness of the protective portion 52 is increased with respect to the shoulder portion of the dome portion 14. In general, it is useful because the thickness of the reinforcing layer 20 may be reduced in the shoulder portion of the dome portion 14. A space portion 56 is formed between the protective portion 52 and the reinforcing layer 20.

The protective portion 52 is not particularly limited. For example, a known hard resin such as a known soft resin such as polyurethane and/or an epoxy resin can be used as a layer structure of one layer or two or more layers.

The connecting portion 54 has an annular shape or a cylindrical shape centered on the axial CL, and is integrally provided in a central portion of the protective portion 52. The connecting portion 54 includes a female threaded portion 58 that is screwed into the male threaded portion 38 on the inner peripheral surface thereof. The protective member 50 is fixed to the tank body 10*a* by fastening by screwing. The connecting portion 54 is formed of, for example, a metal material, but is not particularly limited.

Figure 3A:
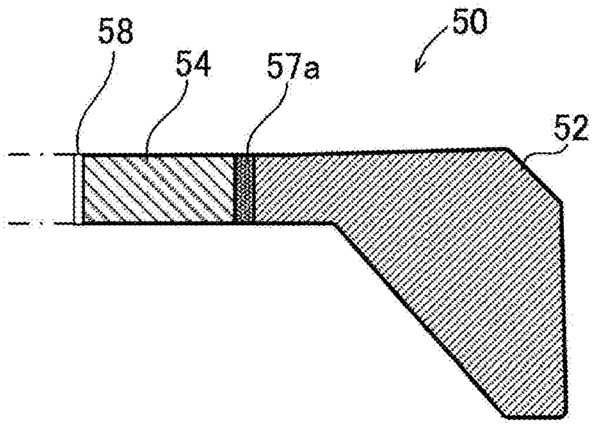
FIG. 3A is a diagram illustrating an embodiment of an integrated configuration of a protective portion and a connecting portion in a protective member.
Figure 3B:
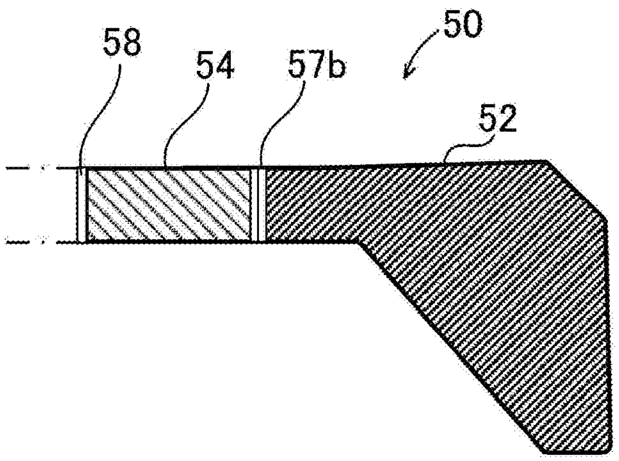
FIG. 3B is a diagram illustrating another embodiment of an integrated configuration of a protective portion and a connecting portion in a protective member.
Figure 3C:
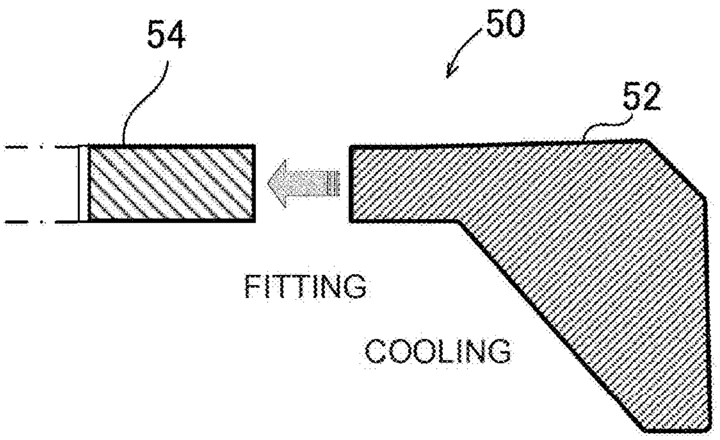
FIG. 3C is a diagram illustrating still another embodiment of an integrated configuration of a protective portion and a connecting portion in a protective member.
Figure 4:
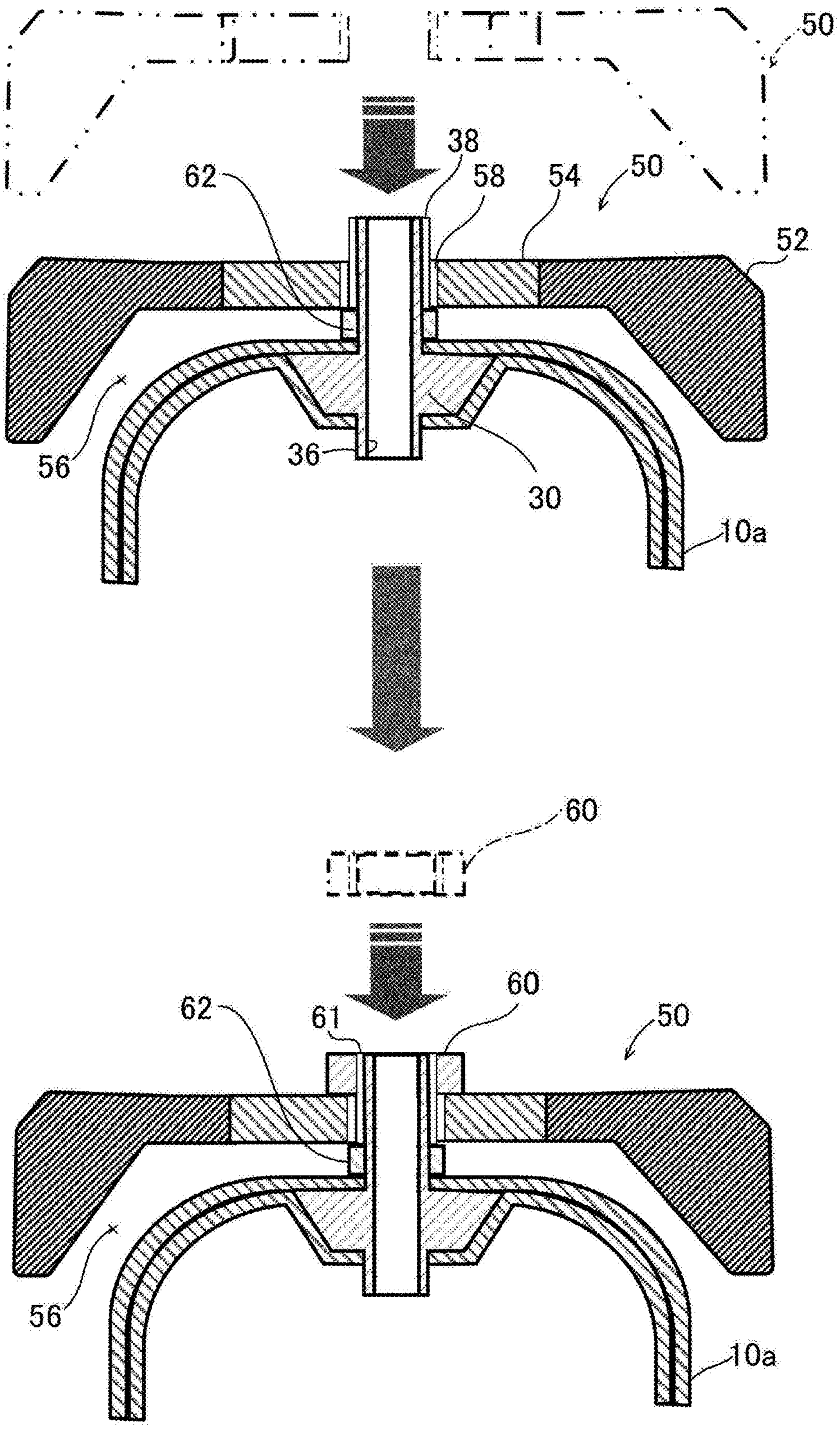
FIG. 4 is a view showing a fastening and fixing step of the protective member to the tank body.

The integration of the protective portion 52 and the connecting portion 54 in the protective member 50 is not particularly limited, but may be, for example, the integration by an adhesive layer 57*a* such as an adhesive as shown in FIG. 3A. Further, integration by a threaded portion 57*b* as shown in FIG. 3B is exemplified. Further, integration by cold fitting as shown in FIG. 3C can be cited.

As shown in FIG. 2, the retaining member 60 is attached to the male threaded portion 38 on one side of the shaft portion 32 beyond the protective member 50. The retaining member 60 prevents the protective member 50 from loosening or coming off. The retaining member 60 is formed as a so-called nut having a female threaded portion 61 that is screwed into the male threaded portion 38 on its inner periphery, and is attached by screwing. The retaining member 60 is configured to abut at least a threaded portion of the male threaded portion 38 and the female threaded portion 58.

The material of the retaining member 60 is not particularly limited, and is formed of, for example, a resin material or a metal material. In addition, the attachment state of the retaining member 60 is not particularly limited. The retaining member 60 may be attached by various methods other than screwing, such as joining. The retaining member 60 is an example of the first movement suppressing member disclosed herein.

As shown in FIG. 2, a spacer 62 is provided on the side of tank body 10*a* of the protective member 50. The spacer 62 is disposed to separate the reinforcing layer 20 covering the flange portion 34 from the protective member 50 at the base portion of the shaft portion 32. The spacer 62 is configured to abut, for example, at least a threaded portion of the male threaded portion 38 and the female threaded portion 58.

The material of the spacer 62 is not particularly limited, and is formed of, for example, a resin material or a metal material. In addition, the attachment state of the spacer 62 is not particularly limited. For example, the spacer 62 may be screwed with a female threaded portion that threadably engages the male threaded portion 38. The spacer is an example of the second movement suppressing member disclosed herein.

Next, the operation of the tank 10 will be described with reference to FIGS. 2 and 4. FIG. 4 shows a process of forming the fastening and fixing structure of the protective member 50 shown in FIG. 2.

As shown in FIG. 4, the tank body 10*a* having the spacer 62 attached to the cap 30 and the protective member 50 are prepared, and the female threaded portion 58 of the protective member 50 is screwed into the male threaded portion 38 of the cap 30. Screwing is completed when the connecting portion 54 abuts the spacer 62. In this way, the fastening force acts in the axial direction of the cap 30. Therefore, it is possible to suppress or avoid a large fastening force applied to the shaft portion 32 in a radial direction perpendicular to the axial CL, and to suppress deformation of the cap 30.

Subsequently, as shown in FIG. 4, the female threaded portion 61 of the retaining member 60 is screwed into the male threaded portion 38 from the outside of the protective member 50 to prevent the protective member 50 from coming off.

As described above, according to the tank 10, since the protective member 50 and the cap 30 are configured as described above, an undesirable load is not applied to the cap 30 which is a component of the tank 10. Therefore, according to the tank 10, the protective member 50 is securely and securely fastened to the tank body 10*a*. Further, the spacer 62 prevents the reinforcing layer 20 and the dome portion 14 from being excessively pressed by the connecting portion 54. Therefore, damage to the reinforcing layer 20 and the dome portion 14 is suppressed or avoided. Further, by screwing the retaining member 60, loosening and coming-off of the protective member 50 is easily avoided, and the fastening and fixing state is securely maintained.

Further, according to the tank 10, the protective member 50 can be easily and accurately attached to the tank body 10*a* without using a fastening member such as a bolt. As a result, it is possible to construct a stable fastening and fixing structure with high accuracy regardless of an operator or the like or environmental conditions.

As shown in FIG. 2, the tank 10 includes a space portion 56 between itself and the dome portion 14 or the reinforcing layer 20. By providing the space portion 56, the expansion of the reinforcing layers 20 when the internal pressure of the tank body 10*a* is applied is suppressed or avoided from being limited by the protective member 50. Therefore, the hydrogen storage efficiency of the tank 10 can be improved.

Figure 5:
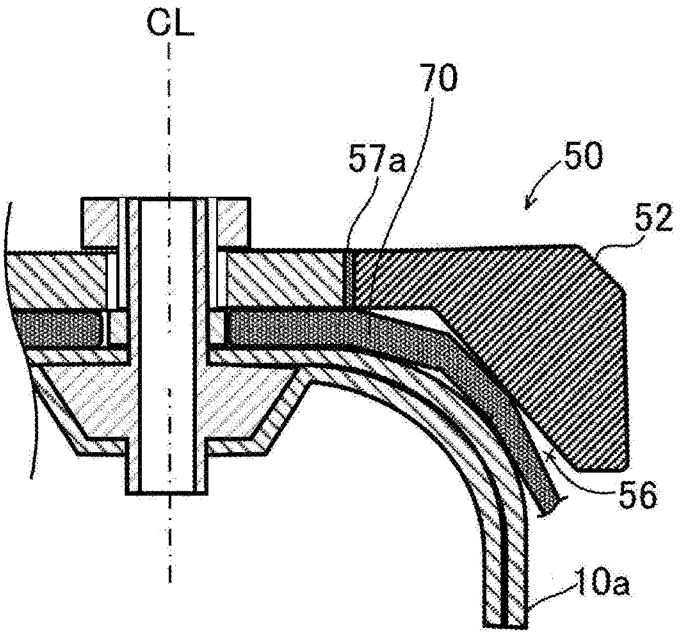
FIG. 5 is a cross-sectional view illustrating a state in which a refractory layer covering a dome portion is fixed by a protective member.

In addition, the fastening and fixing structure of the protective member 50 in the tank 10 can also contribute to the improvement of the fire resistance of the tank 10. For example, as shown in FIG. 5, a refractory layer 70 such as a refractory or thermally insulating sheet may be interposed in the space portion 56. With the fastening and fixing of the protective member 50, the refractory layer 70 is held between the dome portion 14 and the protective portion 52 and is easily and securely fixed. Further, it is useful to use a protective member 50 (see FIG. 3A) in which the protective portion 52 and the connecting portion 54 are integrated by an adhesive layer 57*a*. At this time, when the adhesive layer 57*a* is softened or melted by heating, the protective portion 52 can be detached from the connecting portion 54 by softening or the like of the adhesive layer 57*a* at the time of heating. In this way, the protective portion 52 is suppressed or avoided from hindering the expansion of the refractory layer 70, so that the refractory layer 70 ensures excellent fire resistance and the like.

The action of the protective member 50 described above is also exerted in the case where the protective member 50 is fastened and fixed to the cap 40. In the above-described embodiment, the protective member 50 is provided at both ends of the tank body 10*a*, but it may be provided only on one side. Further, the shape of the protective portion 52 of the protective member 50 is not particularly limited as long as it can exhibit the protection performance against the dome portion 14 and the like. Further, the space portion 56 is provided between the protective member 50 and the dome portion 14 or the reinforcing layer 20, but the present disclosure is not limited thereto.

The present specification includes the following configurations.

[1] A high-pressure gas tank includes: a tank body comprising a body portion, and a dome portion disposed on one side of the axial direction of the body portion;

a cap that includes a shaft portion extending along the axial direction from a central portion of the dome portion and a through-hole penetrating through the shaft portion to allow gas to be distributed through the shaft portion; and a protective member that includes a protective portion covering the dome portion around the cap and made of resin and a connecting portion integrated with the protective portion, having an annular shape or a tubular shape into which the shaft portion of the cap is inserted, and made of metal, in which the cap includes a first threaded portion on an outer periphery of the shaft portion, and the protective member includes a second threaded portion screwed to the first threaded portion on an inner periphery of the connecting portion.

[2] The high-pressure gas tank according to [1], wherein the shaft portion includes a first movement suppressing member that suppresses movement of the protective member toward the one side.

[3] The high-pressure gas tank according to [2], wherein the first movement suppressing member includes a third threaded portion screwed to the first threaded portion.

[4] The dome portion includes a fiber-reinforced resin layer, The high-pressure gas tank according to any one of [1] to [3], wherein the shaft portion is provided with a second movement suppressing member for suppressing the proximity of the protective member to the fiber-reinforced resin layer.

[5] Between the protective member and the surface of the dome portion, provided with a refractory layer held by the protective member, The high-pressure gas tank according to any one of [1] to [4], wherein in the protective member, the protective portion and the connecting portion are integrated by an adhesive softened by heating.

While several specific examples have been described in detail above, these are merely illustrative and do not limit the scope of the claims. The technique described in the claims includes various modifications and variations of the specific examples exemplified above. The technical elements described in this specification or in the drawings may be used alone or in combination to achieve technical usefulness.

What is claimed is:

1. A high-pressure gas tank, comprising:

a tank body that is a cylindrical hollow container including a body portion and a dome portion disposed on one side of the body portion in an axial direction;

a cap including a shaft portion extending along the axial direction from a central portion of the dome portion, a through-hole penetrating through the shaft portion to allow gas to be distributed through the shaft portion, and a first threaded portion at an outer periphery of the shaft portion;

a protective member including a protective portion covering the dome portion around the cap and made of resin, a connecting portion made of metal, having an annular shape into which the shaft portion inserted, the connecting portion being integrated with the protective portion with an adhesive layer, and a diameter of the connecting portion being smaller than a diameter of the body portion, and a second threaded portion screwed to the first threaded portion at an inner periphery of the connecting portion;

a spacer disposed under the first threaded portion and the second threaded portion between the tank body and the protective member, suppressing approach of the protective member to the dome portion; and a nut disposed on the protective member, the nut including a third threaded portion that is screwed to the first threaded portion, the third threaded portion being disposed on the protecting member on a side opposite to the spacer with respect to the connecting portion, suppressing movement of the protective member toward the one side and loosening.

2. The high-pressure gas tank according to claim 1, further comprising a refractory layer disposed between the protective member and an outer surface of the dome portion, the refractory layer being a thermally insulating sheet.

3. The high-pressure gas tank according to claim 1, wherein the protective portion comprises a side wall portion covering an outer periphery of the dome portion and a panel portion covering an opening of the side wall portion.

* * * * *